US006656636B2

United States Patent
Ogasawara et al.

(10) Patent No.: US 6,656,636 B2
(45) Date of Patent: Dec. 2, 2003

(54) NICKEL ELECTRODE FOR ALKALINE STORAGE BATTERY AND ALKALINE STORAGE BATTERY

(75) Inventors: Takeshi Ogasawara, Hirakata (JP); Mitsunori Tokuda, Osaka (JP); Mutsumi Yano, Hirakata (JP)

(73) Assignee: Sanyo Electronic Co., Ltd., Moriguchi (JP)

( * ) Notice: Subject to any disclaimer, the term of this patent is extended or adjusted under 35 U.S.C. 154(b) by 229 days.

(21) Appl. No.: 09/885,976

(22) Filed: Jun. 22, 2001

(65) Prior Publication Data

US 2002/0015886 A1 Feb. 7, 2002

(30) Foreign Application Priority Data

Jun. 30, 2000 (JP) .......................... 2000-197716
Nov. 20, 2000 (JP) .......................... 2000-353392
Mar. 30, 2001 (JP) .......................... 2001-098972

(51) Int. Cl.⁷ ................................. H01M 4/32
(52) U.S. Cl. ................................. 429/223; 429/218.1
(58) Field of Search ....................... 429/218.1, 223, 429/231.5, 231.3

(56) References Cited

U.S. PATENT DOCUMENTS 6,040,087 A * 3/2000 Kawakami ............... 429/218.1

FOREIGN PATENT DOCUMENTS

| EP | 0789408 A2 | 8/1997 |
| EP | 0883397 A1 | 4/1998 |
| EP | 0789408 A3 | 9/1998 |
| EP | 0881698 A1 | 12/1998 |
| EP | 0923146 A1 | 6/1999 |
| JP | 08-222213 | 8/1996 |
| JP | 10-040948 | 2/1998 |
| JP | 10-125318 | 5/1998 |
| JP | 10-149821 | 6/1999 |
| JP | 11-176436 | 7/1999 |

OTHER PUBLICATIONS

European Search Report dated Oct. 10, 2001.

* cited by examiner

*Primary Examiner*—Randy Gulakowski
*Assistant Examiner*—Monique Wills
(74) *Attorney, Agent, or Firm*—Armstrong, Westerman & Hattori, LLP (57) ABSTRACT

A nickel electrode for an alkaline storage battery employed as a positive electrode of an alkaline storage battery is formed by applying a paste containing active material particles composed of nickel hydroxide to a conductive substrate and drying said paste, wherein a conductive layer consisting of cobalt oxide containing sodium is formed on a surface of said active material particles, and niobium powder and/or niobium compound powder is added to the surface of said active material particles.

14 Claims, 1 Drawing Sheet

Fig 1

NICKEL ELECTRODE FOR ALKALINE STORAGE BATTERY AND ALKALINE STORAGE BATTERY

BACKGROUND OF THE INVENTION

1. Field of the Invention

The present invention relates generally to an alkaline storage battery such as a nickel-metal hydride battery, a nickel-cadmium battery, or a nickel-zinc battery and a nickel electrode for an alkaline storage battery employed as a positive electrode of such alkaline storage battery and is particularly characterized in that the nickel electrode for an alkaline storage battery formed by applying a paste containing active material particles composed of nickel hydroxide to a conductive substrate and drying said paste is modified to improve charge/discharge cycle performance of the alkaline storage battery under high temperature conditions.

2. Description of the Related Art

An alkaline storage battery such as a nickel-metal hydride battery or a nickel-cadmium battery has conventionally employed as its positive electrode a nickel electrode for an alkaline storage battery in which nickel hydroxide is used as an active material.

Conventionally, in such nickel electrode for an alkaline storage battery, a sintered nickel electrode formed by impregnating with nickel hydroxide as the active material a sintered substrate which is obtained by filling a porous steel sheet and the like as substrate with nickel powder and sintering said substrate has been used because conductivity of the nickel hydroxide used as the active material is low.

However, in such sintered nickel electrode, bond between particles of the nickel powder is weak. Accordingly, the nickel powder drops out easily when the substrate having high degree of porosity is used. Therefore, the maximum porosity of such substrate is 80% in actual conditions, and hence, the substrate is not sufficiently filled with nickel hydroxide as the active material, thus an alkaline storage battery having a large capacity was hardly attained.

Further, in the above-mentioned sintered nickel electrode, substrate including the porous steel sheet is used, thus filling density of the active material is generally small. In addition, a pore diameter of the nickel powder formed by sintering is generally small, for example, not more than 10 $\mu$m. Thus, in filling the substrate with the active material, solution impregnating method in which laborious work is repeatedly performed must be taken, thereby degrading productivity.

Therefore, a paste type nickel electrode for an alkaline storage battery formed by applying a paste which is obtained by mixing the active material particles composed of nickel hydroxide with a aqueous solution of a binding agent such as methyl cellulose to a conductive substrate having the high degree of porosity such as foamed nickel and drying said paste has been used.

In such paste type nickel electrode for an alkaline storage battery, the conductive substrate having the porosity of not less than 95% can be used. Accordingly, the conductive substrate can be filled with a large number of active materials, thus, the alkaline storage battery having the large capacity is attained, and the conductive substrate can be easily filled with active materials thereby improving the productivity.

However, in such paste type nickel electrode for an alkaline storage battery, when the conductive substrate having the high degree of porosity is used to fill the conductive substrate with the large number of active materials, collecting current of the conductive substrate degrades, thereby reducing the utilization of the active materials.

Therefore, in recent years, in such paste type nickel electrode for an alkaline storage battery, a method in which metal cobalt or a cobalt compound composed of a cobalt oxide or a hydroxide as a conductive agent are added to the above-mentioned active material particles composed of nickel hydroxide, subsequently the above-mentioned metal cobalt and the cobalt compound are oxidized to $\beta$-CoOOH which is cobalt oxyhydroxide by charging, to increase the conductivity of the electrode, thus to improve the utilization of the active materials has been used.

However, even in a case in which the metal cobalt or the cobalt compound as the conductive agent are added to the active material particles composed of nickel hydroxide, there still have remained problems that when the paste type nickel electrode for an alkaline storage battery is employed as the positive electrode of the alkaline storage battery and is charged under high temperature conditions, an oxygen overvoltage in the positive electrode is decreased, thus in addition to a charge reactivity in which nickel hydroxide is oxidized to nickel oxyhydroxide, a side reaction in which an oxygen evolution reactivity occurs and hence, charge characteristics is decreased occur.

Therefore, in Japanese Patent Laid-Open No. Hei8(1996)-222213, in the paste type nickel electrode for an alkaline storage battery, adding a niobium compound and the like in addition to the conductive agent composed of the metal cobalt or the cobalt compound to the surface of the active material particles composed of nickel hydroxide to increase the oxygen overvoltage in the positive electrode by the niobium compound and the like, and hence to improve the charge characteristics under high temperature conditions has been proposed.

However, even in the case where the paste type nickel electrode for an alkaline storage battery in which the niobium compound and the like in addition to the conductive agent composed of the metal cobalt and the cobalt compound are added to the surface of the active material particles composed of nickel hydroxide is used, when charge/discharge is carried out under high temperature conditions, discharge depth during discharge becomes deep, thus cobalt oxyhydroxide which is oxidized metal cobalt or oxidized cobalt compound is reduced to the cobalt hydroxide, then the cobalt hydroxide dissolves in an alkaline electrolyte solution of the alkaline storage battery, subsequently, the cobalt hydroxide deposits on the surface of the active material particles.

A speed in which the cobalt hydroxide dissolves in the alkaline electrolyte solution and deposits as mentioned above is so fast that when the charge and discharge is carried out repeatedly under high temperature conditions, cobalt hydroxide does not deposit on the surface of the active material particles composed of nickel hydroxide uniformly but the cobalt hydroxide segregates on the surface of the active material particles, and a part of the cobalt hydroxide diffuses in the pore, thereby reducing the conductivity of the nickel electrode for an alkaline storage battery gradually, as the result, a charge/discharge cycle performance under high temperature conditions is degraded.

SUMMARY OF THE INVENTION

An object of the present invention is to modify a nickel electrode for an alkaline storage battery formed by applying a paste containing active material particles composed of nickel hydroxide to a conductive substrate and drying said paste.

Another object of the present invention is, in an alkaline storage battery employing as its positive electrode the above-mentioned nickel electrode for an alkaline storage battery, to prevent a discharge capacity from decreasing when charge/discharge is carried out under high temperature conditions, and to improve a charge/discharge cycle performance under high temperature conditions.

The nickel electrode for an alkaline storage battery according to the present invention is a nickel electrode for an alkaline storage battery formed by applying the paste containing the active material particles composed of the nickel hydroxide to the conductive substrate and drying said paste, wherein a conductive layer consisting of cobalt oxide containing sodium is formed on a surface of said active material particles, and niobium powder and/or niobium compound powder is added to the surface of said active material particles.

As the above-mentioned nickel electrode for an alkaline storage battery, when the conductive layer consisting of the cobalt oxide containing sodium is formed on the surface of the active material particles composed of the nickel hydroxide, collecting current in the electrode is improved, thereby improving the utilization of the active material because electric conductivity of the cobalt oxide containing sodium is higher than that of metal cobalt or cobalt compound.

Further, as the above-mentioned nickel electrode for an alkaline storage battery, when the conductive layer consisting of the cobalt oxide containing sodium is formed on the surface of the active material particles composed of nickel hydroxide and the niobium powder or the niobium compound powder is added to the surface of the active material particles composed of the nickel hydroxide, the cobalt oxide containing sodium is prevented from being reduced to the cobalt hydroxide during discharge and dissolving into an alkaline electrolyte solution in the alkaline storage battery even in a case in which the alkaline storage battery employing the nickel electrode for an alkaline storage battery is charged/discharged under high temperature conditions. In addition, even in the case in which a part of the cobalt oxide containing sodium is reduced to the cobalt hydroxide, the speed in which the cobalt hydroxide dissolves in the alkaline electrolyte solution and deposits is delayed, the cobalt hydroxide is prevented from segregating on the surface of the active material particles and a part of the cobalt hydroxide is restrained from diffusing in the pore, as the result, the charge/discharge cycle performance under high temperature conditions is improved by an effect of the above-mentioned niobium or the niobium compound.

In the above-mentioned nickel electrode for an alkaline storage battery, the conductive layer consisting of the cobalt oxide containing sodium is formed on the surface of the active material particles composed of the nickel hydroxide by mixing metal cobalt powder, cobalt hydroxide powder, cobalt monoxide powder, or cobalt oxyhydroxide powder with the active material particles, or by forming a layer consisting of metal cobalt, cobalt hydroxide, cobalt monoxide, or cobalt oxyhydroxide on the surface of the active material particles, in both cases followed by adding a sodium hydroxide aqueous solution and heat-treating in the atmosphere that is in the presence of oxygen at a temperature of 50 to 200° C.

In heat-treating, the temperature is set in the range of 50 to 200° C. because in the case in which the temperature is not more than 50° C., $CoHO_2$ which is low in the electric conductivity deposits while in the case in which the temperature is not less than 200° C., 3-cobalt tetraoxide $Co_3O_4$ which is low in the electric conductivity deposits, accordingly in both cases, the conductive layer having a high conductivity is not attained. When the particles of the cobalt oxyhydroxide are added to the surface of the active material particles or the layer composed of the cobalt oxyhydroxide is formed on the surface of the active material particles, $CoHO_2$ does not deposit even in the case in which the heat-treating temperature is not more than 50° C. However, sodium is hardly contained, accordingly the conductive layer having the high conductivity is not attained. Time for the above-mentioned heat-treating is not especially limited but is altered appropriately depending on concentration of the sodium hydroxide to be used or the heat-treating temperature. The time is approximately set in the range of 0.5 to 10 hours.

When the conductive layer consisting of the cobalt oxide containing sodium is formed on the surface of the active material particles composed of the nickel hydroxide as mentioned above, the cobalt oxide containing sodium contains a quite high electric conductivity, although its chemical structure is not clear. Accordingly, the cobalt oxide containing sodium is expected to be not a mixture of the cobalt oxide and sodium but a intercalation complex in which sodium is inserted into a crystal of the cobalt oxide.

The above-mentioned layer consisting of metal cobalt, cobalt hydroxide, or cobalt monoxide is formed on the surface of the active material particles composed of the nickel hydroxide by mechanical charging method in which metal cobalt powder, cobalt hydroxide powder, or cobalt monoxide powder is added to the nickel hydroxide powder and dry mixing said nickel hydroxide powder by a compressible crusher under inert-gas atmosphere.

The above-mentioned layer consisting of cobalt hydroxide is formed on the surface of the active material particles composed of nickel hydroxide by depositing cobalt hydroxide on the surface of the nickel hydroxide particles including the steps of adding nickel hydroxide powder to a cobalt salt aqueous solution such as cobalt nitrate, dropping an alkaline aqueous solution such as a sodium hydroxide aqueous solution into an obtained mixture while agitating the obtained mixture to adjust the pH of the solution to around 11 and reacting a resultant solution for an appointed time while agitating the resultant solution.

The above-mentioned layer consisting of the cobalt oxyhydroxide is formed on the surface of the active material particles composed of nickel hydroxide, for example, by oxidizing the cobalt hydroxide including the steps of forming the layer consisting of cobalt hydroxide on the surface of the active material particles composed of nickel hydroxide, and reacting the layer thus formed with hydrogen peroxide water which is heated to about 40° C.

In forming the conductive layer consisting of the cobalt oxide containing sodium on the surface of the active material particles composed of nickel hydroxide as mentioned above, when the weight ratio of the conductive layer is too small, the conductivity of the nickel electrode for an alkaline storage battery is not fully improved. On the other hand, when the weight ratio of the conductive layer is too large, a ratio of nickel hydroxide in the nickel electrode for an alkaline storage battery is decreased, thereby decreasing the discharge capacity. Therefore, the weight ratio of cobalt element in the conductive layer based on the weight ratio of the active material particles composed of nickel hydroxide is preferably set in the range of 1.0 to 10 wt %.

In the above-mentioned conductive layer consisting of the cobalt oxide containing sodium, when the weight ratio of sodium element in the cobalt oxide containing sodium is too small or too large, the cobalt oxide containing sodium is easily reduced to cobalt hydroxide during discharge under high temperature conditions in both cases. Therefore, the weight ratio of the sodium element in the cobalt oxide containing sodium is preferably set in the range of 0.1 to 10 wt %.

In adding the niobium powder or the niobium compound powder to the surface of the active material particles on which the above-mentioned conductive layer is formed, when an additive weight ratio is too small, the charge and discharge cycle performance under high temperature conditions is not fully prevented from decreasing. On the other hand, when the additive weight ratio is too large, the ratio of nickel hydroxide in the nickel electrode for an alkaline storage battery is decreased, thereby decreasing the discharge capacity. Therefore, the weight ratio of a niobium element in the niobium powder and/or the niobium compound powder to be added based on a total weight of the active material particles composed of the nickel hydroxide and the above-mentioned conductive layer is preferably set in the range of 0.2 to 4.0 wt %.

Examples of the above-mentioned niobium compound include $Nb_2O_5$, $Nb_2O_3$, $NbO$, $NbO_2$, $NaNbO_3$, $LiNbO_3$, $KNbO_3$, $Nb_2O_5 \cdot xH_2O$.

When a particle diameter of the above-mentioned niobium powder or the niobium compound powder is too large, an area of the niobium powder or the niobium compound powder which contacts with the surface of the active material particles on which the conductive layer is formed is decreased, thus sufficient effect is not attained. Therefore, the niobium powder and/or the niobium compound powder having an average particle diameter of not more than 100 $\mu$m is preferably used.

In the nickel electrode for an alkaline storage battery according to the present invention, at least one type of an element selected from a group consisting of zinc, cobalt, calcium, magnesium, aluminum, manganese, yttrium, and ytterbium is preferably incorporated into the above-mentioned active material particles composed of the nickel hydroxide and the ratio of these elements based on the total weight of the nickel in the above-mentioned nickel hydroxide and these elements is preferably set to not more than 10 atomic % to prevent the potassium ion and the like in the alkaline electrolyte solution from being intercalated into the crystal of nickel hydroxide as the active material for the effect of the elements incorporated, thus to prevent the decrease of the charge/discharge capacity by drying out of the alkaline electrolyte solution. Especially, when at least one of the elements selected from zinc and cobalt is incorporated, the decrease of the charge/discharge capacity by drying out of the alkaline electrolyte solution is further prevented because of a greater effect of these two elements.

In the nickel electrode for an alkaline storage battery according to the present invention, when at least one type of element powder or its compound powder selected from the group consisting of yttrium, ytterbium, calcium, aluminum, erbium, gadolinium, thulium, lutetium, and zinc in addition to the niobium powder and/or the niobium compound powder are added to the surface of the active material particles on which the conductive layer consisting of cobalt oxide containing sodium is formed as mentioned above, the charge/discharge cycle performance under high temperature conditions is further improved. Especially, when yttrium or yttrium compound are added, the charge/discharge cycle performance under high temperature conditions is remarkably improved because of the greater effect.

In the alkaline storage battery employing as its positive electrode the nickel electrode for an alkaline storage battery according to the present invention, examples of the conductive substrate to apply the above-mentioned paste containing the active material particles include foamed nickel, pannose metal fiber, punching metal, and the like.

In the nickel electrode for an alkaline storage battery according to the present invention, the alkaline electrolyte solution containing potassium, lithium, and sodium is preferably used to improve discharge performance under high temperature conditions, thus to prevent an oxygen evolution during charge/discharge, and more preferably, the alkaline electrolyte solution containing 4.0 to 10.0 mol/l of potassium hydroxide, 0.1 to 2.0 mol/l of lithium hydroxide, and 0.2 to 4.0 mol/l of sodium hydroxide.

Examples of the alkaline storage battery employing as its positive electrode the above-mentioned nickel electrode for an alkaline storage battery include a nickel-metal hydride battery employing as its negative electrode a hydrogen absorbing alloy electrode, a nickel-cadmium battery employing as its negative electrode a cadmium electrode, and a nickel-zinc battery employing as its negative electrode a zinc electrode.

These and other objects, advantages and features of the invention will become apparent from the following description thereof taken in conjunction with the accompanying drawings which illustrate a specific embodiment of the invention.

DESCRIPTION OF THE PREFERRED EMBODIMENTS

The following examples specifically illustrate a nickel electrode for an alkaline storage battery and an alkaline storage battery employing as its positive electrode the nickel electrode for an alkaline storage battery. Further, comparative examples will be taken to make it clear that in each alkaline storage battery according to the examples, a charge/discharge cycle performance under high temperature conditions is improved. It should be appreciated that the nickel electrode for an alkaline storage battery and the alkaline storage battery according to the present invention are not particularly limited to those in the following examples, and various changes and modifications may be made in the invention without departing from the spirit and scope thereof.

EXAMPLE 1

In the example 1, in fabricating a nickel electrode for an alkaline storage battery, 100 g of nickel hydroxide powder as an active material was dissolved in 1 liter of a cobalt sulfate aqueous solution containing 10.5 g of cobalt sulfate. While agitating an obtained mixture, 10.0 wt % of a sodium hydroxide aqueous solution was added to the obtained mixture to adjust the pH of the solution to around 11, and an agitation was continued for an hour. A precipitate thus obtained was filtered, was rinsed, and was vacuum dried to form a layer consisting of cobalt hydroxide on a surface of nickel hydroxide particles as the active material.

Subsequently, the above-mentioned nickel hydroxide particles on which the layer consisting of cobalt hydroxide was formed and 25.0 wt % of the sodium hydroxide aqueous solution were mixed in a weight ratio of 1:10, were heat-treated at a temperature of 90° C. for 5 hours, were rinsed, and were dried at the temperature of 60° C. to form a conductive layer consisting of cobalt oxide containing sodium on the surface of the nickel hydroxide particles as the active material.

When the conductive layer consisting of cobalt oxide containing sodium was formed on the surface of the nickel hydroxide particles as the active material, a weight ratio of cobalt element in the conductive layer based on the nickel hydroxide particles as the active material was 4.0 wt %.

Further, to measure the weight ratio of sodium in the above-mentioned conductive layer consisting of the cobalt oxide containing sodium, cobalt hydroxide powder and 25.0 wt % of the sodium hydroxide aqueous solution were mixed in the weight ratio of 1:10, were heat-treated at the temperature of 90° C. for 5 hours, were rinsed, and were dried at the temperature of 60° C. to form the cobalt oxide containing sodium in the same manner as the above-mentioned case. As to the cobalt oxide containing sodium, the weight ratio of sodium element Na in the cobalt oxide containing sodium measured by atomic absorption spectroscopy was 1.0 wt %, and a valence of cabalt measured by redox titration was 3.1.

The above-mentioned nickel hydroxide particles on which the conductive layer consisting of cobalt oxide containing sodium was formed was mixed with $Nb_2O_5$ powder having the average particle diameter of 1.0 μm which is a niobium compound in the weight ratio of 100:2.9, subsequently, 20 parts by weight of 1.0 wt % of a methylcellulose aqueous solution as a binding agent was added to 100 parts by weight of the mixture thus obtained followed by mixing to prepare a paste. The paste thus obtained was filled into the foamed nickel as a conductive substrate having a porosity of 95% and an average pore diameter of 200 μm. The paste was dried and pressure-formed to fabricate the nickel electrode for an alkaline storage battery. In the nickel electrode for an alkaline storage battery, the weight ratio of the niobium element Nb based on the total weight of the nickel hydroxide particles and the conductive layer consisting of cobalt oxide containing sodium was 2.0 wt %.

The above-mentioned nickel electrode for an alkaline storage battery was employed as the positive electrode while a paste type cadmium electrode which has been conventionally generally employed as the negative electrode was employed as the negative electrode. Polyamid non-woven fabric was used as a separator, and a aqueous solution containing 336.6 g of KOH, 20.0 g of NaOH and 41.9 g of $LiOH.H_2O$/l was used an alkaline electrolyte solution. In the alkaline electrolyte solution, concentration of potassium hydroxide, sodium hydroxide, and lithium hydroxide was respectively 6.0 mol/l, 0.5 mol/l, and 1.0 mol/l.

Figure 1:
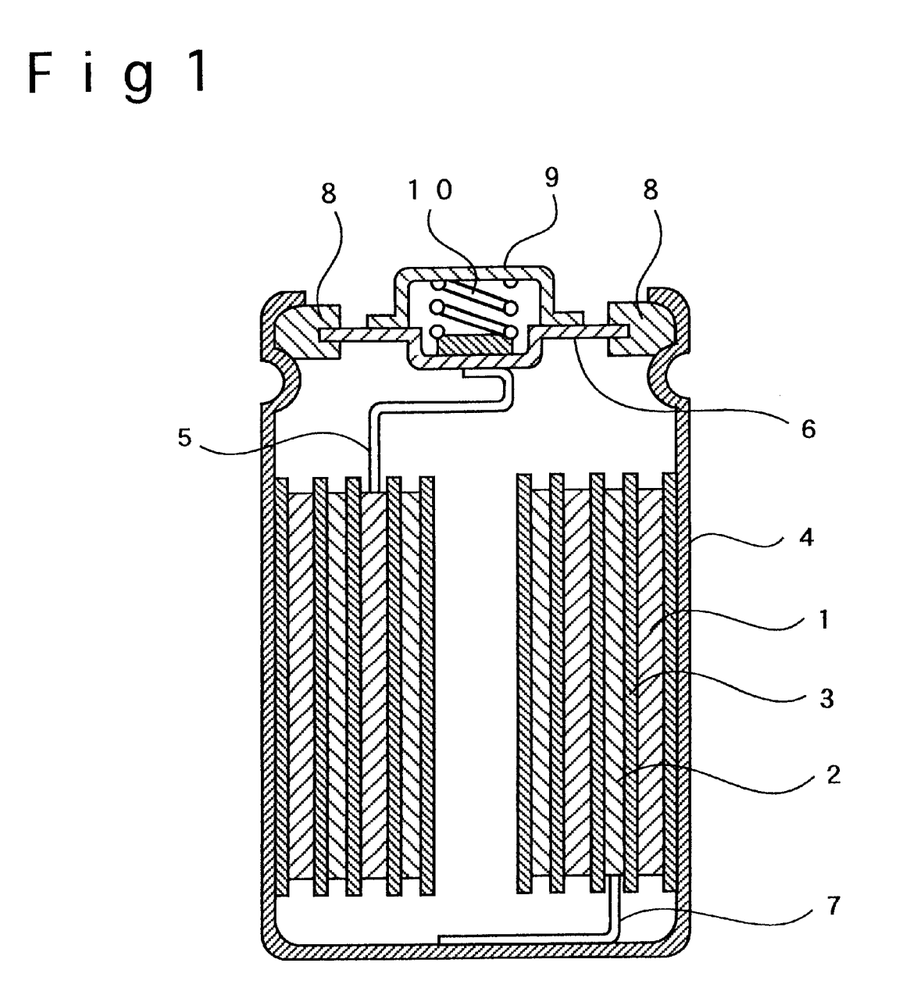
FIG. 1 is a schematic sectional view of each of alkaline storage batteries fabricated in examples and comparative examples of the invention.

Thus an alkaline storage battery of AA size as shown in FIG. 1 was fabricated.

In fabricating the alkaline storage battery, a separator 3 was interposed between a positive electrode 1 and a negative electrode 2, was wound up in a spiral shape, and was contained in a battery can 4. Thereafter, the alkaline electrolyte solution was poured into the battery can 4, to seal the battery can 4. The positive electrode 1 was connected to a positive electrode cover 6 through a positive electrode lead 5, and the negative electrode 2 was connected to the battery can 4 through a negative electrode lead 7. The battery can 4 and the positive electrode cover 6 were electrically isolated by an insulating packing 8.

A coil spring 10 was provided between the positive electrode cover 6 and a positive electrode external terminal 9. When the internal pressure of the battery was abnormally raised, the coil spring 10 was compressed so that gas inside the battery was released into the air.

EXAMPLE 2

In the example 2, in fabricating the nickel electrode for an alkaline storage battery, the conductive layer consisting of cobalt oxide containing sodium was formed on the surface of the nickel hydroxide particles as the active material in the same manner as the above-mentioned example 1. The nickel hydroxide particles as the active material on which the conductive layer consisting of cobalt oxide containing sodium was formed was mixed with Nb powder having the average particle diameter of 1.0 μm in the weight ratio of 100:2. Except for the above, the same procedure as that in the example 1 was taken to fabricate a nickel electrode for an alkaline storage battery.

Except that the nickel electrode for an alkaline storage battery thus fabricated was employed as the positive electrode, the same procedure as that in the example 1 was taken to fabricate an alkaline storage battery according to the example 2.

EXAMPLE 3

In the example 3, in fabricating the nickel electrode for an alkaline storage battery, the conductive layer consisting of cobalt oxide containing sodium was formed on the surface of the nickel hydroxide particles as the active material in the same manner as the above-mentioned example 1. The nickel hydroxide particles as the active material on which the conductive layer consisting of cobalt oxide containing sodium was formed was mixed with $Nb_2O_5$ powder having the average particle diameter of 1.0 μm and Nb powder having the average particle diameter of 1.0 μm in the weight ratio of 100:1.45:1. Except for the above, the same procedure as that in the example 1 was taken to fabricate a nickel electrode for an alkaline storage battery. In the nickel electrode for an alkaline storage battery, the weight ratio of the niobium element Nb based on the total weight of the nickel hydroxide particles and the conductive layer consisting of cobalt oxide containing sodium was also 2.0 wt %.

Except that the nickel electrode for an alkaline storage battery thus fabricated was employed as the positive electrode, the same procedure as that in the example 1 was taken to fabricate an alkaline storage battery according to the example 3.

COMPARATIVE EXAMPLE 1

In the comparative example 1, in fabricating the nickel electrode for an alkaline storage battery, the conductive layer consisting of cobalt oxide containing sodium was formed on the surface of the nickel hydroxide particles as the active material in the same manner as the above-mentioned example 1. The nickel hydroxide particles as the active material on which the conductive layer consisting of cobalt oxide containing sodium was formed was not mixed with $Nb_2O_5$ powder. 20 parts by weight of 1.0 wt % of the methylcellulose aqueous solution as the binding agent was added to 100 parts by weight of the nickel hydroxide particles on which the conductive layer consisting of the cobalt oxide containing sodium was formed. Except for the above, the same procedure as that in the example 1 was taken to fabricate a nickel electrode for an alkaline storage battery.

Except that the nickel electrode for an alkaline storage battery thus fabricated was employed as the positive electrode, the same procedure as that in the example 1 was taken to fabricate an alkaline storage battery according to the comparative example 1.

COMPARATIVE EXAMPLE 2

In the comparative example 2, in fabricating the nickel electrode for an alkaline storage battery, nickel hydroxide particles as the active material, metal cobalt powder, and $Nb_2O_5$ powder having the average particle diameter of 1.0 μm were mixed in the weight ratio of 100:8.9:2.9, subsequently, 20 parts by weight of 1.0 wt % of the methylcellulose aqueous solution as a binding agent was added to 100 parts by weight of the mixture thus obtained. Except for the above, the same procedure as that in the example 1 was taken to fabricate a nickel electrode for an alkaline storage battery.

Except that the nickel electrode for an alkaline storage battery thus fabricated was employed as the positive electrode, the same procedure as that in the example 1 was taken to fabricate an alkaline storage battery according to the comparative example 2.

COMPARATIVE EXAMPLE 3

In the comparative example 3, in fabricating the nickel electrode for an alkaline storage battery, the layer consisting of cobalt hydroxide was formed on the surface of the nickel hydroxide particles as the active material in the same manner as the above-mentioned example 1. The nickel hydroxide particles as the active material on which the layer consisting of cobalt hydroxide was formed was not treated with the sodium hydroxide aqueous solution. The nickel hydroxide particles on which the layer consisting of cobalt hydroxide was formed were mixed with $Nb_2O_5$ powder having the average particle diameter of 1.0 μm in the weight ratio of 100:2.9. Except for the above, the same procedure as that in the example 1 was taken to fabricate a nickel electrode for an alkaline storage battery.

Except that the nickel electrode for an alkaline storage battery thus fabricated was employed as the positive electrode, the same procedure as that in the example 1 was taken to fabricate an alkaline storage battery according to the comparative example 3.

Subsequently, each of the alkaline storage batteries in the examples 1 to 3 and comparative examples 1 to 3 was charged at a charging current of 100 mA for 16 hours under a temperature condition of 25° C. and was discharged to 1.0 V at a discharging current of 1000 mA. Charge/discharge was taken as one cycle. The charge/discharge in 5 cycles was performed, to find a discharge capacity in the fifth cycle in each of the alkaline storage batteries in the examples 1 to 3 and comparative examples 1 to 3.

The discharge capacity in the fifth cycle of the alkaline storage battery in the example 1 was set to 100, to find a relative index of the discharge capacity in the fifth cycle which is taken as capacity performance of the alkaline storage batteries in the examples 1 to 3 and comparative examples 1 to 3. The results were shown in the Table 1.

Further, each of the above-mentioned alkaline storage batteries in the examples 1 to 3 and comparative examples 1 to 3 in which 5 cycles of the charge/discharge were carried out was further charged at the charging current of 500 mA for 2 hours under a high temperature condition of 60° C. and was discharged to 1.0 V at the discharging current of 500 mA. The charge/discharge was taken as one cycle. The charge/discharge cycle test was performed, to find number of cycles until the discharge capacity was decreased to not more than 80% of the discharge capacity in the first cycle under the high temperature condition of 60° C.

The number of cycles of the alkaline storage battery in the example 1 was set to 100, to find the relative index of the number of cycles which was regarded as the charge/discharge cycle performance of the alkaline storage batteries in the examples 1 to 3 and comparative examples 1 to 3. The results were shown in the Table 1.

TABLE 1

| | type of conductive agent | type of additive agent | capacity performance | charge/discharge cycle performance |
|---|---|---|---|---|
| example 1 | Co oxide containing Na | $Nb_2O_5$ | 100 | 100 |
| example 2 | Co oxide containing Na | Nb | 100 | 102 |
| example 3 | Co oxide containing Na | $Nb_2O_5$ + Nb | 100 | 102 |
| comparative example 1 | Co oxide containing Na | — | 97 | 60 |
| comparative example 2 | metal cobalt | $Nb_2O_5$ | 85 | 50 |
| comparative example 3 | cobalt hydroxide | $Nb_2O_5$ | 88 | 55 |

As apparent from the results, each of the alkaline storage batteries in the examples 1 to 3 employing as the positive electrode the nickel electrode for an alkaline storage battery using the nickel hydroxide particles on which the conductive layer consisting of cobalt oxide containing sodium was formed and the niobium powder or the niobium compound powder was added was improved in the charge/discharge cycle performance under the high temperature conditions compared with the alkaline storage batteries according to the comparative examples 1 to 3.

EXAMPLES A1 to A4

In the examples A1 to A4, in fabricating the nickel electrode for an alkaline storage battery, the layer consisting of cobalt hydroxide was formed on the surface of the nickel hydroxide particles as the active material in the same manner as the above-mentioned example 1. The nickel hydroxide particles as the active material on which the layer consisting of cobalt hydroxide was formed were treated with the sodium hydroxide aqueous solution. In forming the conductive layer consisting of cobalt oxide containing sodium on the surface of the nickel hydroxide particles, 5.0 wt % of the sodium hydroxide aqueous solution in the example A1, 10.0 wt % of the sodium hydroxide aqueous solution in the example A2, 40.0 wt % of the sodium hydroxide aqueous solution in the example A3, and 45.0 wt % of the sodium hydroxide aqueous solution in the example A4 was respectively used. Except for the above, the same procedure as that in the example 1 was taken to fabricate each of nickel electrodes for alkaline storage batteries.

To measure the weight ratio of each of the sodium in the above-mentioned conductive layers consisting of the cobalt oxide containing sodium thus formed, cobalt hydroxide powder and 5.0 wt % of the sodium hydroxide aqueous solution, 10.0 wt % of the sodium hydroxide aqueous solution, 40.0 wt % of the sodium hydroxide aqueous solution, and 45 wt % of the sodium hydroxide aqueous solution were respectively mixed in the weight ratio of 1:10, were heat-treated at the temperature of 90° C. for 5 hours, were rinsed, and were dried at the temperature of 60° C. to form each of the cobalt oxide containing sodium. As to each of the cobalt oxide containing sodium thus formed, the weight ratio of sodium element Na measured by the atomic absorption spectroscopy was respectively 0.05 wt % in the case corresponding to the example A1, 0.1 wt % in the case corresponding to the example A2, 10.0 wt % in the case corresponding to the example A3, and 12 wt % in the case corresponding to the example A4.

Except that each of the nickel electrodes for alkaline storage batteries thus fabricated was employed as the positive electrode, the same procedure as that in the example 1 was taken to fabricate each of alkaline storage batteries according to the examples A1 to A4.

Subsequently, each of the alkaline storage batteries in the examples A1 to A4 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples A1 to A4. The results were shown in the Table 2.

TABLE 2

|  | weight ratio of Na in Co oxide containing Na (wt %) | capacity performance | charge/discharge cycle performance |
|---|---|---|---|
| example A1 | 0.05 | 89 | 65 |
| example A2 | 0.1 | 95 | 92 |
| example 1 | 1.0 | 100 | 100 |
| example A3 | 10 | 99 | 99 |
| example A4 | 12 | 88 | 75 |

Each of the alkaline storage batteries in the examples 1, A2, and A3 employing the nickel electrodes for alkaline storage batteries in which the conductive layer consisting of the cobalt oxide containing sodium which was containing 0.1 to 10.0 wt % of sodium element was formed on the surface of the nickel hydroxide particles was improved in the capacity performance and the charge/discharge cycle performance under high temperature conditions compared with the alkaline storage batteries in the examples A1 and A4 employing the nickel electrodes for alkaline storage batteries in which the weight ratio of the sodium element in the cobalt oxide containing sodium was not in the above-mentioned range.

EXAMPLES B1 to B4

In the examples B1 to B4, in fabricating the nickel electrode for an alkaline storage battery, the amount of the cobalt sulfate in the cobalt sulfate aqueous solution per liter adopted in the example 1 was changed and was respectively set to 1.31 g in the example B1, 2.63 g in the example B2, 26.3 g in the example B3, and 31.6 g in the example B4. Except for the above, the same procedure as that in the example 1 was taken to fabricate each of nickel electrodes for alkaline storage batteries.

In each of the nickel electrodes for alkaline storage batteries thus fabricated, a ratio of the cobalt element Co in the conductive layer consisting of cobalt oxide containing sodium formed on the surface of the nickel hydroxide particles as the active material based on the nickel hydroxide particles as the active material was 0.5 wt % in the example B1, 1.0 wt % in the example B2, 10.0 wt % in the example B3, and 12 wt % in the example B4 as shown in the following Table 3.

Except that each of the nickel electrodes for alkaline storage batteries thus fabricated was employed as the positive electrode, the same procedure as that in the example 1 was taken to fabricate each of alkaline storage batteries according to the examples B1 to B4.

Subsequently, each of the alkaline storage batteries in the examples B1 to B4 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples B1 to B4. The results were shown in the Table 3.

TABLE 3

|  | ratio of Co based on active material particles (wt %) | capacity performance | charge/discharge cycle performance |
|---|---|---|---|
| example B1 | 0.5 | 90 | 75 |
| example B2 | 1 | 98 | 98 |
| example 1 | 4 | 100 | 100 |
| example B3 | 10 | 95 | 100 |
| example B4 | 12 | 90 | 100 |

Each of the alkaline storage batteries in the examples 1, B2, and B3 employing the nickel electrodes for alkaline storage batteries in which the weight ratio of the cobalt element in the conductive layer consisting of cobalt oxide containing sodium based on the nickel hydroxide particles as the active material was 1.0 to 10.0 wt % was improved in the capacity performance and the charge/discharge cycle performance under high temperature conditions compared with the alkaline storage battery in the example B1 employing the nickel electrode for an alkaline storage battery in which the weight ratio of cobalt element was 0.5 wt %, and was also improved in the capacity performance compared with the alkaline storage battery in the example B4 employing the nickel electrode for an alkaline storage battery in which the weight ratio of cobalt element was 12 wt %.

EXAMPLES C1 to C7

In the examples C1 to C7, in fabricating the nickel electrode for an alkaline storage battery, the conductive layer consisting of cobalt oxide containing sodium was formed on the surface of the nickel hydroxide particles as the active material in the same manner as the above-mentioned example 1.

In mixing the nickel hydroxide particles on which the conductive layer consisting of cobalt oxide containing sodium was formed with the $Nb_2O_5$ powder having the average particle diameter of 1.0 μm, the weight ratio between the nickel hydroxide particles on which the conductive layer was formed and the $Nb_2O_5$ powder having the average particle diameter of 1.0 μm was respectively set to 100:0.01 in the example C1, 100:0.07 in the example C2, 100:0.29 in the example C3, 100:1.45 in the example C4, 100:4.3 in the example C5, 100:5.7 in the example C6, and 100:7.2 in the example C7. Except for the above, the same procedure as that in the example 1 was taken to fabricate each of nickel electrodes for alkaline storage batteries.

In each of the nickel electrodes for alkaline storage batteries thus fabricated, the ratio of the niobium element Nb based on the total weight of the nickel hydroxide particles and the conductive layer consisting of cobalt oxide containing sodium was 0.01 wt % in the example C1, 0.05 wt % in the example C2, 0.2 wt % in the example C3, 1.0 wt % in the example C4, 3.0 wt % in the example C5, 4.0 wt % in the example C6, and 5.0 wt % in the example C7 as shown in the following Table 4.

Except that each of the nickel electrodes for alkaline storage batteries thus fabricated was employed as the positive electrode, the same procedure as that in the example 1 was taken to fabricate each of alkaline storage batteries according to the examples C1 to C7.

Subsequently, each of the alkaline storage batteries in the examples C1 to C7 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples C1 to C7. The results were shown in the Table 4.

TABLE 4

| | ratio of Nb based on active material particles on which conductive layer was formed (wt %) | capacity performance | charge/ discharge cycle performance |
|---|---|---|---|
| example C1 | 0.01 | 100 | 86 |
| example C2 | 0.05 | 100 | 88 |
| example C3 | 0.2 | 100 | 98 |
| example C4 | 1 | 100 | 99 |
| example 1 | 2 | 100 | 100 |
| example C5 | 3 | 99 | 100 |
| example C6 | 4 | 99 | 100 |
| example C7 | 5 | 92 | 100 |

Each of the alkaline storage batteries in the examples 1 and C3 to C6 employing the nickel electrodes for alkaline storage batteries in which the ratio of the niobium element based on the total weight of nickel hydroxide particles and the conductive layer consisting of the cobalt oxide containing sodium was 0.2 to 4.0 wt % was improved in the charge/discharge cycle performance under high temperature conditions compared with the alkaline storage batteries in the examples C1 and C2 employing the nickel electrodes for alkaline storage batteries in which the ratio of the niobium element was respectively 0.01 wt % and 0.05 wt %, and was also improved in the capacity performance compared with the alkaline storage battery in the example C7 employing the nickel electrode for an alkaline storage battery in which the ratio of the niobium element was 5.0 wt %.

EXAMPLES D1 to D6

In the examples D1 to D6, in fabricating the nickel electrode for an alkaline storage battery, the conductive layer consisting of cobalt oxide containing sodium was formed on the surface of the nickel hydroxide particles as the active material in the same manner as the above-mentioned example 1.

In mixing the nickel hydroxide particles on which the conductive layer consisting of cobalt oxide containing sodium was formed with the $Nb_2O_5$ powder in the weight ratio of 100:2.9, the average particle diameter of the $Nb_2O_5$ powder was changed. Specifically, the $Nb_2O_5$ powder respectively having the average particle diameter of 0.1 μm in the example D1, 10 μm in the example D2, 20 μm in the example D3, 50 μm in the example D4, 100 μm in the example D5, and 150 μm in the example D6 was used as shown in the following Table 5. Except for the above, the same procedure as that in the example 1 was taken to fabricate each of nickel electrodes for alkaline storage batteries.

Except that each of the nickel electrodes for alkaline storage batteries thus fabricated was employed as the positive electrode, the same procedure as that in the example 1 was taken to fabricate each of alkaline storage batteries according to the examples D1 to D6.

Subsequently, each of the alkaline storage batteries in the examples D1 to D6 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples D1 to D6. The results were shown in the Table 5.

TABLE 5

| | average particle diameter of $Nb_2O_5$ (wt %) | capacity performance | charge/ discharge cycle performance |
|---|---|---|---|
| example D1 | 0.1 | 100 | 100 |
| example 1 | 1 | 100 | 100 |
| example D2 | 10 | 100 | 100 |
| example D3 | 20 | 100 | 100 |
| example D4 | 50 | 99 | 100 |
| example D5 | 100 | 98 | 95 |
| example D6 | 150 | 96 | 80 |

Each of the alkaline storage batteries in the examples 1 and D1 to D5 employing the nickel electrodes for alkaline storage batteries in which the $Nb_2O_5$ powder having the average particle diameter of not more than 100 μm was added to the nickel hydroxide particles on which the conductive layer consisting of cobalt oxide containing sodium was formed was improved in the charge/discharge cycle performance under high temperature conditions compared with the alkaline storage battery in the example D6 employing the nickel electrode for an alkaline storage battery in which the $Nb_2O_5$ powder having the average particle diameter of 150 μm was added.

EXAMPLES E1 to E12

In the examples E1 to E12, in fabricating the nickel electrode for an alkaline storage battery, the conductive layer consisting of cobalt oxide containing sodium was formed on the surface of the nickel hydroxide particles as the active material in the same manner as the above-mentioned example 1.

In addition to 2.9 parts by weight of the $Nb_2O_5$ powder having the average particle diameter of 1.0 μm, 1.27 parts by weight of $Y_2O_3$ powder in the example E1, 1.00 part by weight of Y powder in the example E2, 1.57 parts by weight of $Y(OH)_3$ powder in the example E3, 1.14 parts by weight of $Yb_2O_3$ powder in the example E4, 1.84 parts by weight of $Ca(OH)_2$ powder in the example E5, 2.89 parts by weight of $Al(OH)_3$ powder in the example E6, 1.14 parts by weight of $Er_2O_3$ powder in the example E7, 1.15 parts by weight of $Gd_2O_3$ powder in the example E8, 1.14 parts by weight of $Tm_2O_3$ powder in the example E9, 1.14 parts by weight of $Lu_2O_3$ powder in the example E10, 1.24 parts by weight of ZnO powder in the example E11, and 0.63 part by weight of $Y_2O_3$ powder and 0.57 part by weight of $Yb_2O_3$ powder in the example E12 was respectively added to 100 parts by weight of the nickel hydroxide particles on which the conductive layer consisting of cobalt oxide containing sodium was formed.

When the $Nb_2O_5$ powder and each of the above-mentioned compound powder were mixed with the nickel hydroxide particles on which the conductive layer consisting of cobalt oxide containing sodium was formed, the ratio of the niobium element Nb based on the total weight of the nickel hydroxide particles and the conductive layer was 2.0 wt % as in the case of the example 1.

As to the ratio of each element (M1) yttrium Y, ytterbium Yb, calcium Ca, aluminum Al, Erbium Er, gadolinium Gd, thulium Tm, lutetium Lu, and zinc Zn in each compound which was thus added based on the total weight of the nickel hydroxide particles on which the conductive layer was formed, the weight ratio of each element (M1) was respectively 1.0 wt % in the examples E1 to E11 and 1.0 wt % in total in the example E12 because the weight ratio of each element yttrium Y and ytterbium Yb was respectively 0.5 wt % as shown in the following Table 6.

Except that each of the nickel electrodes for alkaline storage batteries thus fabricated was employed as the positive electrode, the same procedure as that in the example 1 was taken to fabricate each of alkaline storage batteries according to the examples E1 to E12.

Subsequently, each of the alkaline storage batteries in the examples E1 to E12 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples E1 to E12. The results were shown in the Table 6.

TABLE 6

| | type of addition except $Nb_2O_5$ | type of M1 | ratio of M1 (wt %) | capacity performance | charge/discharge cycle performance |
|---|---|---|---|---|---|
| example E1 | $Y_2O_3$ | Y | 1 | 100 | 122 |
| example E2 | Y | Y | 1 | 100 | 118 |
| example E3 | $Y(OH)_3$ | Y | 1 | 100 | 118 |
| example E4 | $Yb_2O_3$ | Yb | 1 | 99 | 111 |
| example E5 | $Ca(OH)_2$ | Ca | 1 | 100 | 110 |
| example E6 | $Al(OH)_3$ | Al | 1 | 100 | 110 |
| example E7 | $Er_2O_3$ | Er | 1 | 100 | 110 |
| example E8 | $Gd_2O_3$ | Gd | 1 | 98 | 110 |
| example E9 | $Tm_2O_3$ | Tm | 1 | 100 | 111 |
| example E10 | $Lu_2O_3$ | Lu | 1 | 100 | 111 |
| example E11 | ZnO | Zn | 1 | 100 | 111 |
| example E12 | $Y_2O_3$ $Yb_2O_3$ | Y Yb | 0.5 0.5 | 100 | 115 |
| example 1 | — | — | — | 100 | 100 |

Each of the alkaline storage batteries in the examples E1 to E12 employing the nickel electrodes for alkaline storage batteries in which the above-mentioned $Y_2O_3$ powder and the like in addition to $Nb_2O_5$ powder were added to the nickel hydroxide particles on which the conductive layer consisting of cobalt oxide containing sodium was formed was improved in the charge/discharge cycle performance under high temperature conditions compared with the alkaline storage battery in the example 1.

EXAMPLES E1.1 to E1.8

In the examples E1.1 to E1.8, in fabricating the nickel electrode for an alkaline storage battery, the nickel hydroxide particles on which the conductive layer consisting of cobalt oxide containing sodium was formed was mixed with the $Nb_2O_5$ powder having the average particle diameter of 1.0 μm and the $Y_2O_3$ powder in the same manner as the above-mentioned example E1.

In the examples E1.1 to E1.8, in mixing the nickel hydroxide particles on which the conductive layer was formed with the $Nb_2O_5$ powder and the $Y_2O_3$ powder, the additive weight ratio was changed. The weight ratio of the niobium element Nb and the yttrium element Y based on the total weight of the nickel hydroxide particles on which the conductive layer was formed was respectively set to 0.1 wt % containing 0.05 wt % of Nb and 0.05 wt % of Y in the example E1.1, 0.2 wt % containing 0.1 wt % of Nb and 0.1 wt % of Y in the example E1.2, 0.4 wt % containing 0.2 wt % of Nb and 0.2 wt % of Y in the example E1.3, 0.6 wt % containing 0.3 wt % of Nb and 0.3 wt % of Y in the example E1.4, 1.0 wt % containing 0.5 wt % of Nb and 0.5 wt % of Y in the example E1.5, 2.0 wt % containing 1.0 wt % of Nb and 1.0 wt % of Y in the example E1.6, 4.0 wt % containing 2.0 wt % of Nb and 2.0 wt % of Y in the example E1.7, and 6.0 wt % containing 3.0 wt % of Nb and 3.0 wt % of Y in the example E1.8 as shown in the following Table 7.

Except that each of the nickel electrodes for alkaline storage batteries thus fabricated was employed as the positive electrode, the same procedure as that in the example 1 was taken to fabricate each of alkaline storage batteries according to the examples E1.1 to E1.8.

Subsequently, each of the alkaline storage batteries in the examples E1.1 to E1.8 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples E1.1 to E1.8. The results were shown in the Table 7.

TABLE 7

|  | ratio of Nb (wt %) | ratio of Y (wt %) | ratio of Nb + Y (wt %) | capacity performance | charge/discharge cycle performance |
|---|---|---|---|---|---|
| example E1.1 | 0.05 | 0.05 | 0.1 | 100 | 88 |
| example E1.2 | 0.1 | 0.1 | 0.2 | 100 | 98 |
| example E1.3 | 0.2 | 0.2 | 0.4 | 100 | 118 |
| example E1.4 | 0.3 | 0.3 | 0.6 | 100 | 122 |
| example E1.5 | 0.5 | 0.5 | 1 | 100 | 125 |
| example E1.6 | 1 | 1 | 2 | 100 | 124 |
| example E1.7 | 2 | 2 | 4 | 96 | 120 |
| example E1.8 | 3 | 3 | 6 | 90 | 114 |
| example E1 | 2 | 1 | 3 | 100 | 122 |
| example 1 | 2 | — | 2 | 100 | 100 |

In mixing the nickel hydroxide particles on which the conductive layer consisting of cobalt oxide containing sodium was formed with the $Nb_2O_5$ powder and the $Y_2O_3$ powder, when a total weight ratio of the niobium element and the yttrium element based on nickel hydroxide particles on which the conductive layer was formed was not more than 0.1 wt %, the alkaline storage battery was decreased in the charge/discharge cycle performance under high temperature conditions, while when the total weight ratio of the niobium element and the yttrium element was not less than 6.0 wt %, the alkaline storage battery was decreased in the capacity performance.

Therefore, in mixing the nickel hydroxide particles on which the conductive layer consisting of cobalt oxide containing sodium was formed with the $Nb_2O_5$ powder and the $Y_2O_3$ powder, the total weight ratio of the niobium element Nb and the yttrium element Y based on the nickel hydroxide particles on which the conductive layer was formed was preferably set in the range of 0.2 wt % to 4.0 wt %, and more preferably, in the range of 1.0 wt % to 2.0 wt %.

EXAMPLES F1 to F12

In the examples F1 to F12, in fabricating the nickel electrode for an alkaline storage battery, 9.7 g of aluminum sulfate $Al_2(SO_4)_3$ in the example F1, 8.6 g of manganese sulfate $MnSO_4$ in the example F2, 8.8 g of cobalt sulfate $CoSO_4$ in the example F3, 9.2 g of zinc sulfate $ZnSO_4$ in the example F4, 7.7 g of calcium sulfate $CaSO_4$ in the example F5, 6.8 g of magnesium sulfate $MgSO_4$ in the example F6, 13.2 g of yttrium sulfate $Y_2(SO_4)_3$ in the example F7, 18.0 g of ytterbium sulfate $Yb_2(SO_4)_3$ in the example F8, 18.1 g of manganese sulfate $MnSO_4$ in the example F9, 22.2 g of manganese sulfate $MnSO_4$ in the example F10, 4.2 g of manganese sulfate $MnSO_4$ and 4.3 g of cobalt sulfate $CoSO_4$ in the example F11, and 4.4 g of cobalt sulfate $CoSO_4$ and 4.6 g of zinc sulfate $ZnSO_4$ in the example F12 was respectively added to 167 g of nickel sulfate.

Subsequently, 5.0 wt % of ammonia water and 10.0 wt % of sodium hydroxide aqueous solution was dropped simultaneously into 5 liters of each aqueous solution in which the above-mentioned material was respectively dissolved. Each aqueous solution was reacted while adjusting the pH of the solution to around 11. The precipitate thus obtained was filtered, was rinsed, and was dried to obtain the nickel hydroxide particles in which each element (M2) Al, Mn, Co, Zn, Ca, Mg, Y, Yb was incorporated.

An atomic ratio of the each element (M2) based on the total weight of nickel Ni in the nickel hydroxide particles and the each element (M2) Al, Mn, Co, Zn, Ca, Mg, Y, Yb which was respectively incorporated (Ni+M2) was 5.0 atomic % in the examples F1 to F8, 10 atomic % in the example F9, 12 atomic % in the example F10, 2.5 atomic % of Mn and 2.5 atomic % of Co in the example F11, 2.5 atomic % of Co and 2.5 atomic % of Zn in the example F13.

Except that the nickel hydroxide particles in which the above-mentioned each element (M2) was incorporated was used, the same procedure as that in the example 1 was taken to fabricate nickel electrodes for alkaline storage batteries. Except that each of the nickel electrodes for alkaline storage batteries thus fabricated was employed as the positive electrode, the same procedure as that in the example 1 was taken to fabricate each of alkaline storage batteries according to the examples F1 to F12.

Subsequently, each of the alkaline storage batteries in the examples F1 to F12 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples F1 to F12. The results were shown in the Table 8.

TABLE 8

|  | type of M2 | M2/(Ni + M2) × 100 (atomic %) | capacity performance | charge/discharge cycle performance |
|---|---|---|---|---|
| example F1 | Al | 5 | 100 | 112 |
| example F2 | Mn | 5 | 99 | 111 |
| example F3 | Co | 5 | 100 | 113 |
| example F4 | Zn | 5 | 100 | 113 |
| example F5 | Ca | 5 | 100 | 110 |
| example F6 | Mg | 5 | 98 | 110 |
| example F7 | Y | 5 | 100 | 111 |
| example F8 | Yb | 5 | 100 | 111 |
| example F9 | Mn | 10 | 97 | 111 |
| example F10 | Mn | 12 | 89 | 110 |
| example F11 | Mn | 2.5 | 100 | 111 |
|  | Co | 2.5 |  |  |
| example F12 | Co | 2.5 | 100 | 115 |
|  | Zn | 2.5 |  |  |
| example 1 | — | — | 100 | 100 |

Each of the alkaline storage batteries in the examples F1 to F12 employing the nickel electrodes for alkaline storage batteries which are using the nickel hydroxide powder in which the above-mentioned each element (M2) was incorporated was improved in the charge/discharge cycle performance under high temperature conditions compared with the alkaline storage battery in the example 1. However, the alkaline storage battery in the example F10 in which the weight ratio of M2 (Mn in the case of the example F10) to be incorporated was 12 atomic % was decreased in the capacity performance.

EXAMPLES G1 to G12

In the examples G1 to G12, except that the type of the alkaline electrolyte solution used in the above-mentioned alkaline storage battery in the example 1 was changed, the same procedure as that in the example 1 was taken to fabricate each of alkaline storage batteries according to the examples G1 to G12.

In the examples G1 to G12, the amount of KOH, NaOH, and LiOH.H$_2$O to be dissolved in the alkaline electrolyte solution per liter was changed. Specifically, the amount was respectively set to 336.6 g of KOH, 20.0 g of NaOH, and 0.42 g of LiOH.H$_2$O in the example G1, 336.6 g of KOH, 20.0 g of NaOH, and 4.19 g of LiOH.H$_2$O in the example G2, 336.6 g of KOH, 20.0 g of NaOH, and 83.8 g of LiOH.H$_2$O in the example G3, 336.6 g of KOH, 20.0 g of NaOH, and 92.0 g of LiOH.H$_2$O in the example G4, 336.6 g of KOH, 4.0 g of NaOH, and 41.9 g of LiOH.H$_2$O in the example G5, 336.6 g of KOH, 8.0 g of NaOH, and 41.9 g of LiOH.H$_2$O in the example G6, 336.6 g of KOH, 160.0 g of NaOH, and 41.9 g of LiOH.H$_2$O in the example G7, 336.6 g of KOH, 168.0 g of NaOH, and 41.9 g of LiOH.H$_2$O in the example G8, 168.3 g of KOH, 20.0 g of NaOH, and 41.9 g of LiOH.H$_2$O in the example G9, 224.4 g of KOH, 20.0 g of NaOH, and 41.9 g of LiOH.H$_2$O in the example G10, 561.0 g of KOH, 20.0 g of NaOH, and 41.9 g of LiOH.H$_2$O in the example G11, 673.2 g of KOH, 20.0 g of NaOH, and 41.9 g of LiOH.H$_2$O in the example G12. The concentration (mol/l) of each of the KOH, NaOH, and LiOH.H$_2$O in each alkaline electrolyte solution in the examples G1 to G12 was shown in the following Table 9.

Subsequently, each of the alkaline storage batteries in the examples G1 to G12 was charged and discharged under the temperature condition of 25° C. for 5 cycles to find the discharge capacity in the fifth cycle, subsequently, the charge/discharge was performed repeatedly under the high temperature condition of 60° C. to find number of cycles until the discharge capacity was decreased to not more than 80% of the discharge capacity in the first cycle under the high temperature condition of 60° C.

The discharge capacity and the number of cycles in the fifth cycle of the alkaline storage battery in the example 1 was set to 100, to find the discharge capacity and the relative index of the number of cycles which were respectively regarded as the capacity performance and the charge/discharge cycle performance of the alkaline storage batteries in the examples G1 to G12. The results were shown in the Table 9.

TABLE 9

| | concentration of KOH (mol/l) | concentration of NaOH (mol/l) | concentration of LiOH (mol/l) | capacity performance | charge/discharge cycle performance |
|---|---|---|---|---|---|
| example 1 | 6.0 | 0.5 | 1.0 | 100 | 100 |
| example G1 | 6.0 | 0.5 | 0.01 | 96 | 88 |
| example G2 | 6.0 | 0.5 | 0.1 | 97 | 98 |
| example G3 | 6.0 | 0.5 | 2.0 | 100 | 102 |
| example G4 | 6.0 | 0.5 | 2.2 | 96 | 85 |
| example G5 | 6.0 | 0.1 | 1.0 | 96 | 88 |
| example G6 | 6.0 | 0.2 | 1.0 | 99 | 100 |
| example G7 | 6.0 | 4.0 | 1.0 | 101 | 102 |
| example G8 | 6.0 | 4.2 | 1.0 | 102 | 85 |
| example G9 | 3.0 | 0.5 | 1.0 | 92 | 88 |
| example G10 | 4.0 | 0.5 | 1.0 | 96 | 95 |
| example G11 | 10.0 | 0.5 | 1.0 | 102 | 99 |
| example G12 | 12.0 | 0.5 | 1.0 | 105 | 82 |

Each of the alkaline storage batteries in the examples 1, G2, G3, G6, G7, G10, and G11 employing the alkaline electrolyte solution in which the concentration of KOH, NaOH, and LiOH was respectively in the range of 4.0 to 10.0 mol/l, 0.2 to 4.0 mol/l, and 0.1 to 2.0 mol/l was improved in the charge/discharge cycle performance under high temperature conditions compared with the alkaline storage batteries in the examples G1, G4, G5, G8, G9, and G12 employing the alkaline electrolyte solution in which the concentration of KOH, NaOH, and LiOH was not in the above-mentioned range.

Although the present invention has been fully described by way of examples, it is to be noted that various changes and modification will be apparent to those skilled in the art.

Therefore, unless otherwise such changes and modifications depart from the scope of the present invention, they should be construed as being included therein.

What is claimed is:

1. A nickel electrode for an alkaline storage battery formed by applying a paste containing active material particles composed of nickel hydroxide to a conductive substrate and drying said paste, wherein a conductive layer consisting of cobalt oxide containing sodium is formed on a surface of said active material particles, and niobium powder and/or niobium compound powder is added to the surface of said active material particles.

2. The nickel electrode for an alkaline storage battery according to claim 1, wherein a weight ratio of an sodium element in said cobalt oxide containing sodium is in a range of 0.1 to 10 wt %.

3. The nickel electrode for an alkaline storage battery according to claim 1, wherein the weight ratio of a cobalt element in said conductive layer consisting of the cobalt oxide containing sodium based on the active material particles composed of the nickel hydroxide is in the range of 1.0 to 10 wt %.

4. The nickel electrode for an alkaline storage battery according to claim 1, wherein the weight ratio of a niobium element in said niobium powder and/or said niobium compound powder to be added based on a total weight of the active material particles composed of the nickel hydroxide and said conductive layer is in the range of 0.2 to 4.0 wt %.

5. The nickel electrode for an alkaline storage battery according to claim 1, wherein an average particle diameter of said niobium powder and/or said niobium compound powder is not more than 100 μm.

6. The nickel electrode for an alkaline storage battery according to claim 1, wherein at least one type of an element selected from a group consisting of zinc, cobalt, calcium, magnesium, aluminum, manganese, yttrium, and ytterbium is incorporated into said active material particles composed of the nickel hydroxide.

7. The nickel electrode for an alkaline storage battery according to claim 6, wherein a ratio of an incorporated element based on the total weight of nickel in said active material particles and the incorporated element is not more than 10 atomic %.

8. The nickel electrode for an alkaline storage battery according to claim 6, wherein at least one of the element selected from zinc and cobalt is incorporated in said active material particles composed of the nickel hydroxide.

9. The nickel electrode for an alkaline storage battery according to claim 1, wherein at least one type of element powder or its compound powder selected from the group consisting of yttrium, ytterbium, calcium, aluminum, erbium, gadolinium, thulium, lutetium, and zinc in addition to said niobium powder and/or said niobium compound powder are added to the surface of said active material particles.

10. The nickel electrode for an alkaline storage battery according to claim 9, wherein yttrium powder or yttrium compound powder in addition to said niobium powder and/or said niobium compound powder are added.

11. The nickel electrode for an alkaline storage battery according to claim 9, wherein $Y_2O_3$ powder as an yttrium compound in addition to said niobium powder and/or said niobium compound powder are added.

12. An alkaline storage battery employing as its positive electrode a nickel electrode for an alkaline storage battery according to claim 1.

13. The alkaline storage battery according to claim 12, wherein an alkaline electrolyte solution containing potassium, lithium, and sodium is used.

14. The alkaline storage battery according to claim 13, wherein said alkaline electrolyte solution contains 4.0 to 10.0 mol/l of potassium hydroxide, 0.1 to 2.0 mol/l of lithium hydroxide, and 0.2 to 4.0 mol/l of sodium hydroxide.

* * * * *